US008705553B2

(12) United States Patent
Rune (10) Patent No.: US 8,705,553 B2
(45) Date of Patent: Apr. 22, 2014

(54) METHOD FOR ENABLING A HOME BASE STATION TO CHOOSE BETWEEN LOCAL AND REMOTE TRANSPORTATION OF UPLINK DATA PACKETS

(75) Inventor: Johan Rune, Lidingö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 290 days.

(21) Appl. No.: 13/121,793

(22) PCT Filed: Jul. 8, 2009

(86) PCT No.: PCT/SE2009/050879
§ 371 (c)(1),
(2), (4) Date: Mar. 30, 2011

(87) PCT Pub. No.: WO2010/039084
PCT Pub. Date: Apr. 8, 2010

(65) Prior Publication Data
US 2011/0182227 A1 Jul. 28, 2011

Related U.S. Application Data

(60) Provisional application No. 61/101,726, filed on Oct. 1, 2008.

(51) Int. Cl.
*H04W 88/10* (2009.01)
*H04L 12/54* (2013.01)

(52) U.S. Cl.
USPC ........................................ 370/428; 370/465

(58) Field of Classification Search
CPC .... H04W 88/10; H04L 12/5692; H04L 12/54
USPC .......... 370/328, 329, 338, 465.389, 392, 351, 370/428, 429; 455/524, 525, 450, 451, 452
See application file for complete search history.

(56) References Cited

U.S. PATENT DOCUMENTS

| 2005/0041638 A1* | 2/2005 | Peng .............................. 370/352 |
| 2005/0089014 A1* | 4/2005 | Levin et al. .................... 370/351 |
| 2008/0069101 A1* | 3/2008 | Oksanen ........................ 370/392 |

(Continued)

FOREIGN PATENT DOCUMENTS

| CN | 1764294 A | 4/2006 | |
| EP | 1560378 A2 * | 8/2005 | .............. H04L 12/56 |

(Continued)

OTHER PUBLICATIONS

International Search Report corresponding to PCT Application No. PCT/SE2009/050879, Date of Mailing: Jan. 14, 2010.

(Continued)

*Primary Examiner* — Hanh N Nguyen
(74) *Attorney, Agent, or Firm* — Myers Bigel Sibley & Sajovec, PA (57) ABSTRACT

The present invention relates to methods and devices that allow for different types of transportation of data packets (6) in conjunction with a home base station (1). Traffic arriving in the home base station (1) from a mobile terminal (2) connected to the home base station (1) can be transported either via a core network (15) of a mobile telecommunications system or by means of local transportation, which implies that the traffic is forwarded to a local node (4) in a local network (20) without passing the core network (15). The home base station (1) examines data packets (6) that are received from the mobile terminal (1) and determines the appropriate type of transportation for each data packet (6). Thus it is not required for traffic that is destined for local nodes (4) to pass the core network (15), which allows for efficient traffic forwarding with several benefits such as offloading the core network (15).

38 Claims, 5 Drawing Sheets

(56) References Cited

U.S. PATENT DOCUMENTS

| | | | |
|---|---|---|---|
| 2008/0107109 A1* | 5/2008 | Michaud | 370/390 |
| 2008/0261563 A1* | 10/2008 | Drevon et al. | 455/411 |
| 2009/0016282 A1* | 1/2009 | Gasparroni et al. | 370/329 |
| 2009/0196266 A1* | 8/2009 | Wu et al. | 370/338 |

FOREIGN PATENT DOCUMENTS

| | | |
|---|---|---|
| EP | 1 650 907 A2 | 4/2006 |
| GB | 2 381 158 | 4/2003 |
| GB | 2 428 942 | 2/2007 |
| WO | WO 2004/034646 | 4/2004 |
| WO | WO2009/132435 | 11/2009 |

OTHER PUBLICATIONS

Chinese First Office Action Corresponding to Chinese Patent Application No. 200980139567.4; Date of Issue: Apr. 3, 2013; 25 Pages.

* cited by examiner

METHOD FOR ENABLING A HOME BASE STATION TO CHOOSE BETWEEN LOCAL AND REMOTE TRANSPORTATION OF UPLINK DATA PACKETS

CROSS REFERENCE TO RELATED APPLICATIONS

This application is a 35 U.S.C. §371 national stage application of PCT International Application No. PCT/SE2009/050879, filed on 8 Jul. 2009, which claims the benefit of priority of U.S. Provisional Application No. 61/101,726, filed 1 Oct. 2008. The above-referenced PCT International Application was published in the English language as International Publication No. WO 2010/039084 on 8 Apr. 2010. The disclosures of both of the above referenced applications are hereby incorporated herein in their entireties by reference.

TECHNICAL FIELD

The present invention relates to methods and arrangements in a telecommunications system with a home base station, and in particular to methods and arrangements for handling of traffic in connection with the home base station.

BACKGROUND

In third generation UMTS systems (cf. 3GPP TS 23.002, "3rd Generation Partnership Project; Technical Specification Group Services and Systems Aspects; Network architecture (Release 8)", December 2007) and in particular in its evolved version SAE/LTE (cf. 3GPP TS 23.401 v8.1.0 (also referred to as Evolved Packet System, EPS), "3rd Generation Partnership Project; Technical Specification Group Services and System Aspects; General Packet Radio Service (GPRS) enhancements for Evolved Universal Terrestrial Radio Access Network (E-UTRAN) access (Release 8)", March 2008 and 3GPP TS 36.401 v8.1.0, "3rd Generation Partnership Project; Technical Specification Group Radio Access Network; Evolved Universal Terrestrial Radio Access Network (E-UTRAN); Architecture description (Release 8), March 2008), the concept of home base stations is introduced. In 3G a home base station is referred to as a Home Node B (HNB) whereas in EPS it is referred to as a Home eNode B (HeNB). A home base station is assumed to be placed in a private home, utilizing the home owner's fixed broadband connection to access a core network of mobile telecommunications system. It is also assumed that the home owner handles the actual physical installation of the home base station. Hence, the deployment of home base stations cannot be planned, since it is largely outside the control of an operator of the mobile telecommunications system. Another important property of the home base station concept is the potentially very large number of home base stations.

A home base station (such as a Home NodeB or Home eNodeB) connects to the operator's core network via a secure tunnel (supposedly IPsec protected) to a security gateway at the border of the operator's network. Via this tunnel the home base station connects to the core network nodes of the operator's core network (e.g. MME and S-GW via an S1 interface in EPS or SGSN and MSC (or MGW and MSC server) via an Iu-interface or Iuh interface in 3G UMTS). A 3GPP operator may also deploy a concentrator node in its network between the home base stations and the regular core network nodes. In the EPS standardization such a concentrator node is commonly referred to as a HeNB Gateway, which may be an optional node in EPS HeNB solutions. The corresponding node name in 3G UMTS standardization is HNB Gateway and this node is mandatory in 3G HNB systems.

For both EPS and 3G UMTS the home base station uses a broadband access network as (part of the) transport network. Possible Network Address Translators (NAT) between the home base station and the core network are not a problem for the secure tunnel when using, e.g. an Internet key Exchange Protocol (such as IKEv2), which can handle NAT traversal (i.e. activate UDP (User Datagram Protocol) encapsulation for EPS traffic as needed) and is assumed to be used for the secure tunnel establishment.

Furthermore, the user plane security, the RLC protocol, and the PDCP protocol are terminated in the RNC in 3G and in the eNode B in LTE. When a home base station is used, these protocols are terminated in the home base station (in the HNB, as the RNC functionality is placed in the HNB in the 3G HNB architecture, or in the HeNB in LTE), which makes user plane IP packets readily visible in the home base station.

Through this setup a User Equipment (UE, also referred to as a mobile terminal) can communicate via the home base station and the core network like any other UE. However, since the home base station is connected to its owner's broadband access (e.g. a broadband modem) it is potentially a part of a home LAN (also known as a local CPE network). The UE may thus potentially communicate with other devices connected to the home LAN, e.g. a printer or a computer. As a consequence the home base station related mechanisms must enable a UE to communicate both locally (with devices in the home LAN) and remotely (with devices outside of the home LAN) and it should preferably be possible to mix these two types of traffic and have both local and remote communication sessions ongoing simultaneously.

However, according to prior art solutions a home base station is not able to distinguish and give special treatment to traffic relating to local communication sessions compared to traffic relating to remote communication sessions. There is thus no way in existing home base station solutions to handle local and remote traffic differently in order to achieve more efficient traffic handling adapted to the specific type of traffic.

SUMMARY

An object of the present invention is to provide methods and arrangements that allow for efficient transportation of traffic in a telecommunications system with a home base station.

The above stated object is achieved by means of methods and nodes according to the independent claims.

A basic idea of embodiments of the present invention is to enable the home base station to choose how an uplink data packet received from a mobile terminal is to be transported based on the destination address associated with the uplink data packet. The type of transportation chosen for the data packet can be adapted to the type of session e.g. local or remote, to which the data packet relates. A data packet associated with a local session may be chosen for local transportation, which means that the data packet is forwarded to a local node in a local network to which the home base station is connected without passing a core network of a mobile telecommunications system (e.g. a 3GPP core network).

A first embodiment of the present invention provides a method in a home base station for forwarding of data packets. The home base station has a connection to a mobile terminal over a radio interface, a connection to a local network comprising a number of local nodes, and a connection to a core network of a mobile telecommunications system via an access network. According to the method a number of uplink data packets are received from the mobile terminal over a number of bearers. In the method an address field of an uplink data packet, which was received from the mobile terminal, is examined to identify a destination address associated with the uplink data packet. In another step in the method it is chosen if the packet is to be subject to local transportation and/or core transportation based on the identified destination address. Local transportation implies forwarding the uplink data packet to a local node over the local network without passing the core network. Core transportation implies forwarding the uplink data packet to the core network. In further step the uplink data packet is forwarded in accordance with the chosen type of transportation.

A second embodiment of the present invention provides a home base station for forwarding of data packets. The home base station comprises a radio interface that is adapted for connection to a mobile terminal, an interface that is adapted for connection to a local network comprising a number of local nodes, and an interface that is adapted for connection to a core network of a mobile telecommunications system via an access network. The home base station further comprises an input unit that is adapted to receive a number of uplink data packets from the mobile terminal over a number of bearers. The home base station further comprises a processing unit that is adapted to examine an address field of an uplink data packet received from the mobile terminal to identify a destination address associated with the uplink data packet. The processing unit is further adapted to choose if the packet is to be subject to local transportation and/or core transportation based on the identified destination address. As mentioned above, local transportation implies forwarding the uplink data packet to a local node over the local network without passing the core network, and core transportation implies forwarding the uplink data packet to the core network. The home base station also comprises an output unit that is adapted to forward the uplink data packet in accordance with the type of transportation chosen by the processing unit.

A third embodiment of the present invention provides an operation and maintenance node for use in an operation and maintenance system of a telecommunications system. The operation and maintenance node comprises a configuration unit which is adapted to communicate with a home base station to configure the home base station for local transportation and/or direct Internet transportation. The configuration of the home base station involves providing the home base station with configuration information regarding which destination addresses that are to be subject to local transportation, direct Internet transportation and/or core transportation. Local transportation implies forwarding an uplink data packet, received in the home base station from a mobile terminal over a radio interface, to a local node over a local network without passing a core network of a mobile telecommunications system. Direct Internet transportation implies forwarding the uplink data packet to the Internet via the access network without passing the core network of the mobile telecommunications system. Core transportation implies forwarding the uplink data packet to the core network of the mobile telecommunications system.

A fourth embodiment of the present invention provides a method in an operation and maintenance node of an operation and maintenance system of a telecommunications system. The method includes a step of configuring a home base station for local transportation and/or direct Internet transportation. The configuration step includes communicating with the home base station to provide the home base station with configuration information regarding which destination addresses that are to be subject to local transportation, direct Internet transportation and/or core transportation. Local transportation implies forwarding an uplink data packet, received in the home base station from a mobile terminal over a radio interface, to a local node over a local network without passing a core network of a mobile telecommunications system. Direct Internet transportation implies forwarding the uplink data packet to the Internet via the access network without passing the core network of the mobile telecommunications system. Core transportation implies forwarding the uplink data packet to the core network of the mobile telecommunications system.

An advantage of embodiments of the present invention is that they can provide a mobile terminal (UE) connected to a home base station with the possibility of communicating locally with other nodes connected to a local network (e.g. a home LAN) to which the home base station is connected. During local communication data packets are transported by means of local transportation which implies that the data packets do not pass a core network of a mobile telecommunications system (e.g. a 3GPP core network).

Another advantage of embodiments of the present invention is that when local transportation of data packets is used latency experienced during local communication is drastically reduced.

Yet another advantage of embodiments of the present invention is that when local transportation of data packets is used, the user experience during local communication is improved and the annoyance of having to live with traffic charges and long latencies for local communication is eliminated.

A further advantage of embodiments of the present invention is that when local transportation is used for some data packets, the core network of the mobile telecommunications system is offloaded (and if flat rate is used for the mobile telecommunication subscription such offloading does not reduce the operator's income).

Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. A list summarizing abbreviations used throughout this description is provided at the end of this section.

As mentioned above according to prior art solutions a home base station will treat all traffic equally irrespective of whether the traffic relates to a local session (communication between a UE and devices in a local CPE network) or a remote session (communication between a UE and devices outside of the local CPE network). As a result a number of suboptimal situations may occur. When a UE connected to the home base station wishes to communicate with a local node, i.e. another node in the local CPE network, e.g. a network printer or user equipment for multi-player gaming, IP packets will be routed via a GGSN and Gi interface (for a HNB case) or a PDN Gateway and SGi interface (for a HeNB case) in a 3GPP core network. The home base station is not able to distinguish local CPE network traffic from global traffic. This is severely suboptimal in terms of both performance and resource utilization and the user may experience unreasonable delays. In addition, if the 3GPP operator charges the user for traffic between the UE and another node connected to the local CPE network (because the traffic has been routed via the 3GPP core network), the user will most likely be rather annoyed. Furthermore, if the nodes of the local CPE network are connected to the broadband access network via a Network Address Translator (NAT) (which is a common and likely scenario) they are not reachable from outside the NAT and consequently a UE communicating via the 3GPP core network (and the Gi or SGi interface) will not be able to initiate a communication session towards another node connected to the same local CPE network. If the UE also receives a private (non-routable) address from the 3GPP core network (which is sometimes the case in presently deployed GPRS/UMTS networks), then devices on the local CPE network will not be able to initiate communication sessions towards the UE, which would mean that the UE could not communicate with other nodes on the local CPE network at all (without the aid of an application level rendezvous server). For these reasons it would be beneficial to support local breakout for local traffic in the home base stations, thereby confining local traffic to the local CPE network.

Embodiments of the present invention make it possible for a UE connected to a home base station (e.g. a Home Node B or a Home eNode B) to communicate locally with other nodes connected to the local CPE network (e.g. a home LAN). Traffic between the UE and a node connected to the local CPE network is thus routed locally and not via the 3GPP core network whereby the latency that is experienced during local communication can be reduced and the user experience during local communication can be improved. When traffic is transported locally via the home base station without passing a core network of a mobile communications system (e.g. the 3GPP core network) this will be referred to herein as local transportation or local breakout.

According to embodiments of the present invention the home base station may achieve knowledge about the address range that is used for the local CPE network from its allocated IP address and network mask. In other embodiments knowledge about the address range used for the local CPE network can be achieved, e.g., by means of a learning process or that the home base station knows these addresses inherently in deployment scenarios where the home base station itself allocates the addresses to the local nodes. By examining address fields of uplink data packets (i.e. snoop the IP headers) received from the UE, the home base station may identify the destination addresses of the packets and thus identify locally destined packets and forward them to the local CPE network instead of into an IPsec tunnel towards the 3GPP core network. In certain embodiments of the present invention the home base station employs NAT (and, e.g., simple ALG) functionality between the UE and the local nodes on the local CPE network.

The following describes by means of examples some scenarios within which the present invention could be applied.

Figure 1:
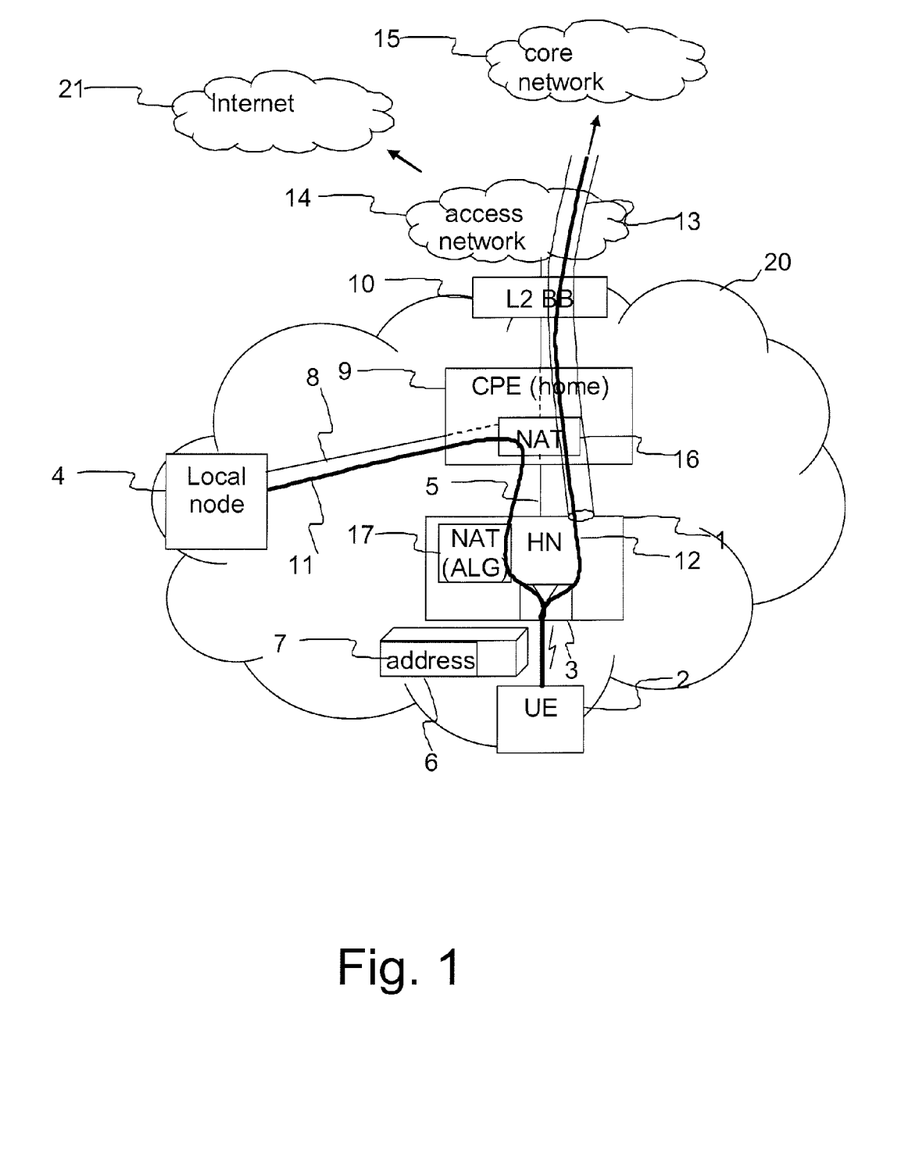
FIG. 1 is a schematic block diagram which illustrates a first application scenario in which an embodiment of the present invention is implemented.

In a first scenario illustrated in FIG. 1 a home base station (HN) 1 is connected to a CPE (home) router 9 with a NAT 16 via an Ethernet/WLAN connection 5 and local nodes 4 (only one local node illustrated for simplicity) are connected to the CPE (home) router via Ethernet/WLAN connection 8. The CPE router 9 is connected to a broadband access network 14 via a L2 broadband CPE 10, such as a broadband modem (and the CPE router 9 and the L2 broadband CPE 10 may also be integrated). The home base connects to a core network 15 (here a 3GPP core network) by means of an IPsec tunnel 13. In this first scenario, the broadband access network 14 allocates one public (global) IPv4 address to each broadband subscriber. A UE 2 may connect to the home base station over a radio interface 3, which is a 3GPP radio interface in this case. The units which are assumed to be located in a home are part of a local CPE network 20 (also referred to as a local network herein).

In a second scenario, similar to the first scenario of FIG. 1, the local nodes 4 are connected the home base station via the 3GPP radio interface 3 instead of to the CPE router via Ethernet/WLAN connections. In other respects the first and second scenarios are alike. However this second scenario is considered unlikely and of lesser interest for the solutions according to the present invention since it probably would be reasonable in this scenario to let the UE 1 and a local node 4 communicate via the 3GPP core network 15, similar to communication between any other two 3GPP terminals.

Figure 2:
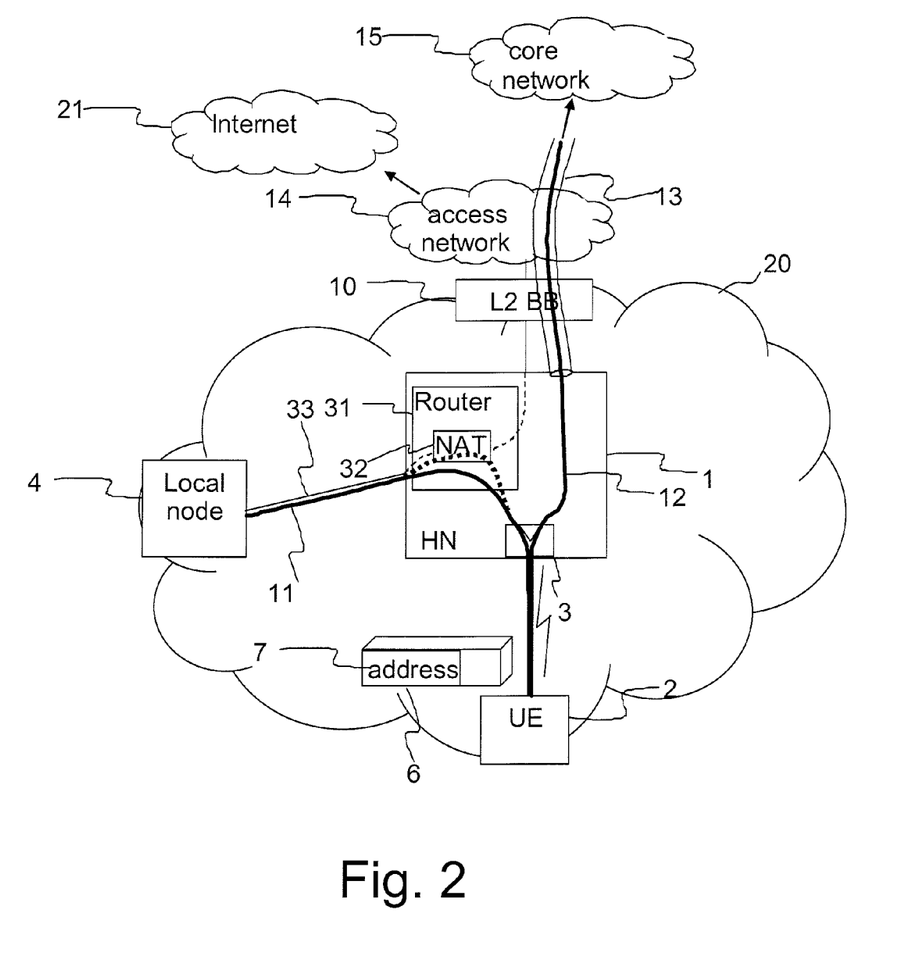
FIG. 2 is a schematic block diagram which illustrates a third application scenario in which an embodiment of the present invention is implemented.

FIG. 2 illustrates a third scenario in which the home base station 1 is connected to a layer 2 broadband CPE 10, e.g. a cable modem or an xDSL (e.g. ADSL) modem, or is integrated with the layer 2 broadband CPE. The home base station 1 has an integrated router 31 with a NAT. Local nodes are connected to the home base station router 31 via Ethernet/WLAN connections 33. The broadband access network 14 allocates one public (global) IPv4 address to each broadband subscriber.

In a fourth scenario, the home base station is connected to a layer 2 broadband CPE 10, e.g. a cable modem or an xDSL (e.g. ADLS) modem, or is integrated with the layer 2 broadband CPE, like in the third scenario. However the local nodes 4 are connected to the home base station via the 3GPP radio interface 3. The broadband access network 14 allocates one public (global) IPv4 address to each broadband subscriber. Like the above mentioned second scenario, this fourth scenario is also considered unlikely and of lesser interest for the solutions according to the present invention since it probably would be reasonable in this scenario to let the UE 1 and a local node 4 communicate via the 3GPP core network 15, similar to communication between any other two 3GPP terminals.

Figure 3:
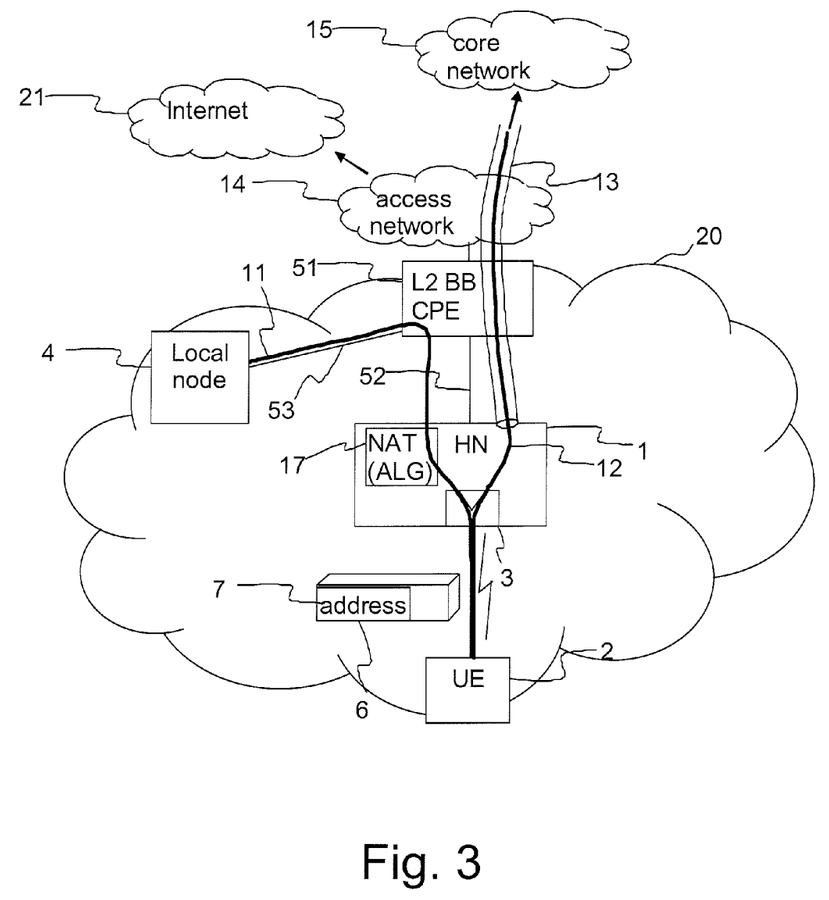
FIG. 3 is a schematic block diagram which illustrates a fifth application scenario in which an embodiment of the present invention is implemented.

In a fifth scenario, illustrated in FIG. 3, the broadband access network 14 can allocate multiple global IP addresses to multiple devices in the local CPE network 20. (This scenario deviates from the assumption of a single address allocated from the broadband access network which is valid for scenarios 1-4). The broadband CPE is a layer 2 broadband CPE 51 acting as a switch between the devices of the local network. The home base station 1 is connected to the layer 2 broadband CPE 51 via an Ethernet/WLAN connection 52. Local nodes 4 are connected to the layer 2 broadband CPE 51 via Ethernet/WLAN connections 53.

To enable local CPE network traffic (i.e. communication between any nodes in the local CPE network 20) devices must be able to discover each other's IP addresses. This is achieved through multicast announcements and requests, e.g. with UPnP (using SSDP), Jini, SLP, etc. or by manually entering the IP address of another device (DNS is normally not used for devices on a local CPE network 20).

Generally, in embodiments of the present invention the task of distinguishing and separating local from global traffic is placed on the home base station. The home base station may e.g. learn the address range used for the local CPE network 20 from its own allocated IP address and network mask or knows these addresses inherently in deployment scenarios where the home base station itself allocates the addresses to the local nodes. The home base station snoops an address field of data packets arriving from a UE 2 connected to the home base station and identifies traffic that is to be subject to local transportation based on the destination address. The following addresses may be chosen for local transportation:

local unicast addresses
multicast addresses
broadcast addresses
possibly unicast addresses of UEs connected to the home base station.

The home base station forwards packets chosen for local transportation to the local CPE network 20 instead of forwarding them to the 3GPP network via the IPsec tunnel. The home base station also receives packets destined for the UE 2 from the local CPE network 20 and forwards them to the UE 2 without passing the core network 15.

If needed, depending on the scenario, the home base station can learn UE addresses by snooping the source address of uplink packets from the UE (or by snooping the destination address of downlink packets from the 3GPP network or by intercepting an address allocation message).

NAS signaling to the 3GPP core network (SGSN or MME) is a part of the bearer setup procedure. This means that the core network 15 will establish a bearer also for the local traffic, i.e. traffic subject to local transportation (unless the UE chooses to run the local traffic on an already established bearer), although this bearer will not be used above the home base station (i.e., only the part over the radio interface 3 is used). The local traffic should normally be of best effort type and then no resources would have to be reserved for the bearers in the 3GPP network 15. According to an embodiment of the present invention, the local breakout functionality is restricted to traffic received over best effort bearers, i.e. uplink data packets received in the home base station from the UE are excluded from local transportation if the bearer over which the uplink data packets were received from the mobile terminal is not a best effort bearer.

The only foreseen potential requirement on the UE (and/or user) is that the UE requests to be allocated an IPv4 address (optionally together with an IPv6 address) during an attach procedure. If needed, the user may be instructed to configure the UE to do this. The ability of a UE to do this is included in the 3GPP standard.

It is possible for the UE 2 to communicate with another UE connected to the home base station using local transportation. However, it should be observed that an idle UE cannot be reached without involving NAS functionality for paging and bearer setup. As it is complex to include this NAS functionality in the home base station, local UE-to-UE communication via the home base station is not possible without support from the 3GPP core network 15, except possibly when the involved UEs both (or all) already have established bearers that can be utilized. In addition, any traffic requiring preceding service layer signaling with network-based support, such as IMS based services, cannot be handled purely locally. However, even though the service signaling requires core network/service network support, conveying the actual media stream does not. If the UE 2 can initiate such service signaling (e.g. IMS/SIP signaling) to establish a communication session towards another UE connected to the home base station 1, the service signaling would be handled in the regular manner (e.g. causing appropriate bearers to be established for the respective UEs) whereas the subsequent media stream could be broken out locally in the home base station 1, bypassing the core network 15. A consequence of this process is that the network part of the established bearers would not actually be used by the media stream. Care needs to be taken to avoid an unnecessarily high degrade of the network performance (e.g. by causing unnecessary denial of service access attempts) in situations of high network load as resources (e.g. for QoS bearers) may be reserved without use. In conjunction with local transportation of the media stream it needs also to be considered that in cases where the charging is volume-based (instead of, e.g., time-based, event-based, or flat fee), the network will not be able to charge for the service despite the possibly wasted resources. Embodiments of the present invention avoid this in the UE-to-UE case by restricting the local breakout functionality to best effort bearers. If local transportation of UE-to-UE traffic is implemented, the home base station recognizes the destination address in the snooped address field as the address of a local UE, extracts the packet from the regular uplink traffic flow and inserts it in the downlink flow of the destination UE. In this context is should also be emphasized that suboptimal routing of UE-to-UE traffic between UEs connected to the same base station is by no means a phenomenon that is specific to home base stations. Routing traffic via the core network 15 is the common procedure for all UE-to-UE communication, irrespective of which base station ((e)Node B(s)) the involved UEs are connected to.

A first embodiment of the present invention is illustrated in FIG. 1 and provides local transportation of traffic in the above mentioned first scenario. The home base station 1 is a HNB or HeNB and identifies uplink IP packets 6 as local traffic if the destination address in an address field 7 in the IP header is:

a unicast address in a private range (or an address range indicated by the home base station's own allocated address and network mask),
a multicast address,
a broadcast address, or
possibly a unicast address of a UE connected to the home base station.

Uplink packets 6 which are not identified to be subject to local transportation are forwarded through the IPsec tunnel 13 according to regular 3GPP protocols, herein referred to as core transportation illustrated by a bold line 12 in FIG. 1. Uplink packets 6 which are identified to be subject to local transportation are extracted from the regular packet flow and forwarded to the CPE router 9 outside the IPsec tunnel 13 and the CPE router forwards the packets to the local node(s) 4. Local transportation traffic is illustrated in FIG. 1 with a bold line 11. The home base station may be configured to identify private range addresses as local (i.e. addresses that is to be subject to local transportation) or learn this from its own allocated IP address and network mask. A packet from a local node 4 destined to the UE 2, e.g. a response packet, should be routed by the CPE router 9 to the home base station. This means that such packets have to have a destination address in the range used in the local network, i.e. typically an address in the private range, and more precisely the destination address has to be the home base station's address, since the UE 2 itself does not have a local address. Consequently, the home base station 1 has to translate between the UE's address and its own address and vice versa, i.e., in essence it has to be a NAT in relation to the UE 2 for local traffic. That is, for an uplink packet 6 identified as local traffic the home base station replaces the UE source address with the home base station address (and creates a regular NAT state internally to be able to cope with multiple simultaneously communicating UEs). For downlink local packets, i.e. packets arriving to the home bases station 1 from the CPE router 9 outside the IPsec tunnel 13, the home base station 1 replaces the destination address (which is its own) with an appropriate UE address (aided by the NAT state in case there are multiple UEs). The NAT functionality in the home base station 1 is illustrated in FIG. 1 and denoted by reference numeral 17. The NAT functionality 17 should also include port translation, when needed.

Local nodes 4 which communicate with each other over the local CPE network 20 (without device specific DNS registration and support) use multicast based protocols to discover each other. This is a good reason to facilitate multicast traffic by treating it as traffic to be subject to local transportation. However, some multicast (and broadcast) messages may be useful also in or outside the 3GPP core network 15. Therefore the home base station should preferably forward uplink multicast (and broadcast) packets both locally and through the IPsec tunnel 13 to the 3GPP core network 15, provided that the same IP version can be used in both cases.

The presence of the NAT 17 in the home base station 1 would normally have the consequence that other local nodes 4 cannot initiate a communication session with the UE 2—the initiative has to come from the UE 2—because of the lack of a NAT state guiding the address translation. However, as long as there is only a single UE 2 connected to the home base station, the home base station may forward packets arriving from the local CPE network 20 to the UE 2 even when there is no NAT state in the home base station, because there is no ambiguity in which UE address to translate to. Thus, as long as there is only a single UE 2 connected to the home base station, the home base station could be designed to support stateless forwarding of downlink local packets, thereby enabling communication sessions towards the UE 2 to be initiated from other local nodes 4. If this feature is supported, the home base station 1 should preferably also contain a simple Application Level Gateway (ALG), e.g. for UPnP and/or SLP, in order to translate the UE address also when it is embedded in a UPnP or SLP message. In any case, local session initiation towards the UE 2 requires that the UE already has a usable bearer established (see above). It is possible that an ALG is needed for some application level protocols, even if session initiation from the local CPE network 20 towards the UE 2 is not supported.

In this first embodiment, the CPE router 9 will function as a router with NAT functionality for traffic to and from the broadband access network 14. However the CPE router 9 will also function as a switch for traffic within the local CPE network 20. Thus it should be noted that the CPE router 9 is in reality a combined router and switch and that for some traffic only the switching functionality of the CPE router 9 will be used.

A second embodiment of the present invention is illustrated in FIG. 2 and provides local transportation of traffic in the above mentioned third scenario. The home base station 1 acts as a router and NAT towards the local (non-UE) nodes 4 on the local CPE network 20 and allocates IP addresses to them from the private range. Consequently the home base station has a complete overview of the addresses being used on the local CPE network 20.

The home base station identifies uplink IP packets 6 from the UE 2 as traffic to be subject to local transportation if the destination address is:
  a unicast address in the private range (that the home base station 1 has allocated to a local node 4),
  a multicast address,
  a broadcast address, or
  possibly a unicast address of a UE connected to the home base station 1.

Traffic subject to local transportation is illustrated with a bold line 11 and traffic subject to core transportation is illustrated with a bold line 12 in FIG. 2. Thus the home base station 1 of this second embodiment is adapted to snoop the destination addresses of packets in order to separate packets into different traffic streams; a stream of local transportation traffic and a stream of core transportation traffic.

The home base station 1 identifies uplink IP packets from a local (non-UE) node 4 as local traffic if the destination address is:
  a unicast address in the private range (that the home base station has allocated to a local node),
  a multicast address,
  a broadcast address, or
  a global unicast address of a UE 2 connected to the home base station.

The home base station uses the IP address allocated by the broadband access network 14 as the address of the interface towards the layer 2 broadband CPE 10 and the broadband access network 14 on the internal router/NAT 31, 32 as well as for the IPsec tunnel 13 interface. The traffic chosen for core transportation does not have to pass through the router/NAT 31, 32 between the UE 2 and the IPsec tunnel 13 interface. The home base station 1 routes all non-local uplink traffic from local (non-UE) nodes 4 to the broadband access network 14, via the layer 2 broadband CPE 10, outside the IP sec tunnel 13. Downlink packets arriving to the home base station 1 outside the IPsec tunnel 13 are address translated in the home base station's NAT 32 and routed to local nodes 4 (see the above described first embodiment relating to the first scenario).

This second embodiment has many similarities to the first embodiment. However, since the home base station is provided with routing functionality to be able to act as a local router for traffic subject to local transportation and the home base station is aware of the UE's 2 global address (or private address in case the 3GPP core network 15 allocates private IPv4 addresses), the local transportation traffic 11 between the UE 2 and a local node 4 (or between two local nodes) does not have to pass through the NAT 32. When the home base station recognizes that the destination address in a packet from a local node 4 as a UE address (connected to the home base station), it determines that it is local traffic and routes the packet to the UE 2. Allowing the UE 2 and local nodes 4 to communicate without a NAT 32 in between means that there is no obstacle to initiating a communication session from a local node 4 towards a UE 2. In this scenario the home base station may actually employ regular layer 2 forwarding (like a layer 2 switch) between the UE 2 and the local CPE network 20 (although there is a risk for confusion when the UE address does not belong to the same local address range as the addresses of the local nodes 4).

In the not so likely case that the home base station employs regular layer 2 forwarding between the UE 2 and the local CPE network 20, the home base station 1 may have to perform Proxy ARP on behalf of the UE 2 (i.e., the home base station 1 should handle ARP signaling on behalf of the UE 2, e.g. when an ARP request for the UE's IP address arrives at the home base station 1, the home base station 1 responds to the request on behalf of the UE 2 with its own hardware address (i.e. IEEE 802 MAC-48 address) in the ARP reply. However, if it is desired that the UE 2 (assumedly having a global, non-private IP address) should appear to the local nodes 4 as being on the same IP subnet, then there is an option to let the traffic between the UE 2 and a local node 4 pass through the NAT 32 anyway. If this option is used, then an ALG and the special feature for the case of a single UE 2 being connected to the home base station 1, i.e. that a communication session could be initiated from a local node 4 towards the UE 2 despite the absence of a NAT state (as described in the first embodiment in relation to the first scenario), could potentially be used also in this second embodiment.

As in the first embodiment the home base station 1 can forward uplink multicast (and broadcast) packets from the UE both by means of local transportation and by means of core transportation i.e. through the IPsec tunnel 13 to the 3GPP core network 15, provided that the same IP version can be used in both cases.

A third embodiment of the present invention is illustrated in FIG. 3 and provides local transportation of traffic in the above mentioned fifth scenario. In this third embodiment, properties depend on the broadband access provider's address allocation strategy and how this is reflected in the allocated network mask. If the entire broadband access network 14 (or parts of it encompassing multiple subscribers) address-wise is treated as a single IP subnet and this is reflected in the allocated network mask, then the task of classifying a packet as local or global becomes difficult for the home base station 1. It cannot rely on a certain address range (i.e. the private range or as specified by its allocated IP address and network mask) to identify traffic for local transportation. Nor is the source address of packets arriving outside the IPsec tunnel 13 a reliable indictor, because there is no way of distinguishing an address in the local CPE network 20 from an address in the remainder of the subnet. What the home base station 1 can do is to treat the entire subnet as "semi-local" traffic, which, however, is acceptable because:
- it is not likely that two subscribers in the same broadband access network 14 will have direct communication with each other. At least such communication is likely to be infrequent, which means that more or less all the traffic that the home base station 1 classifies as "semi-local" will also be confined to the local CPE network 20;
- also the communication between the UE 2 and nodes of other subscribers in the broadband access network 14, if it occurs, benefits from the optimization of local breakout in the home base station 1.

The home base station 1 thus identifies uplink IP packets 6 from the UE 2 as local traffic to be subject to local transportation if the destination address 7 is:
- a unicast address in the range defined by its own allocated address and network mask,
- a multicast address,
- a broadcast address, or
- possibly a unicast address of a UE connected to the home base station 1.

One circumstance that can be used to distinguish truly local addresses (i.e. addresses belonging to nodes 4 in the local CPE network 20) from other addresses in the subnet is the fact that it is not likely that the operator of the broadband access network 14 will allow multicast (or broadcast) traffic with an intended local scope, such as UPnP traffic, to "leak" between different subscribers. If this assumption is correct, then the home base station 1 could potentially learn the addresses of the local nodes 4 address by address. The available means to do this comes in the shape of source addresses of packets arriving from local nodes 4 (via the CPE 51) destined for the UE 2, both multicast (or broadcast) packets and unicast responses to multicast (or broadcast) packets. If this enhancement is used, the home base station may identify uplink IP packets 6 from the UE 2 as local traffic to be subject to local transportation if the destination address 7 is:
- a unicast address previously learnt as belonging to a local node 4,
- a multicast address,
- a broadcast address, or
- possibly a unicast address of a UE connected to the home base station 1.

The home base station 1 forwards uplink packets 6 destined for a local (or "semi-local") node 4 to the CPE 51 outside the IPsec tunnel 13, i.e. by means of local transportation. To allow local return packets to the UE 2 to be conveyed locally, the home base station has to translate the UE's address to an address in the local range, that is, more precisely, to the home base station's 1 own address. This is the same situation as in the first embodiment and consequently the home base station 1 has to include internal NAT (and preferably simple ALG) functionality 17 for this purpose, just as according to the first embodiment. Other mechanisms of this third embodiment correspond to those of the first embodiment.

If the broadband access network 14 address-wise is divided such that each subscriber is allocated a dedicated subnet, then the home base station's 1 allocated IP address and network mask unambiguously defines the range of addresses belonging to the local CPE network 20 (excluding the address of the default gateway in the broadband access network 14, which belongs to the same address range). The simpler identification of local traffic to be subject to local transportation that this allows is the only, albeit not insignificant, impact that the different address allocation strategy has on the previously described solution. The rest of the third embodiment remains unchanged.

The above described three embodiments which are illustrated in FIGS. 1-3 provide a couple of examples of embodiments of the present invention. However there are many further alternatives concerning the embodiments of the present invention, some of which will be discussed below.

When a home base station 1 is installed it is configured via an operation and maintenance (O&M) interface. An O&M node may according to an embodiment of the present invention be adapted to also configure the home base station 1 with an address range (or address ranges) that should be (or should not be) subject to local breakout in the home base station 1. Typically the O&M node indicates the address range (or address ranges) which should NOT be subject to local breakout, i.e. for which the traffic should be excluded from local transportation and instead transported by means of core transportation. This could, e.g., be the address range used in the 3GPP operator's IMS/service network. The traffic destined to any other address can e.g. be broken out locally in the home base station 1. This enables Internet access outside of the IPsec tunnel 13, i.e. breakout in the home base station 1 not only for traffic within the local network 20 but also of traffic to the Internet 21. This is herein referred to as direct Internet transportation which will be discussed in greater detail below. If this configuration method is used, then it is a natural implementation choice to replace the other previously described methods for the home base station 1 to determine the address range that is subject to local breakout (although solutions that are based on combinations of the different described methods are feasible as will be appreciated by a person skilled in the art).

Figure 6:
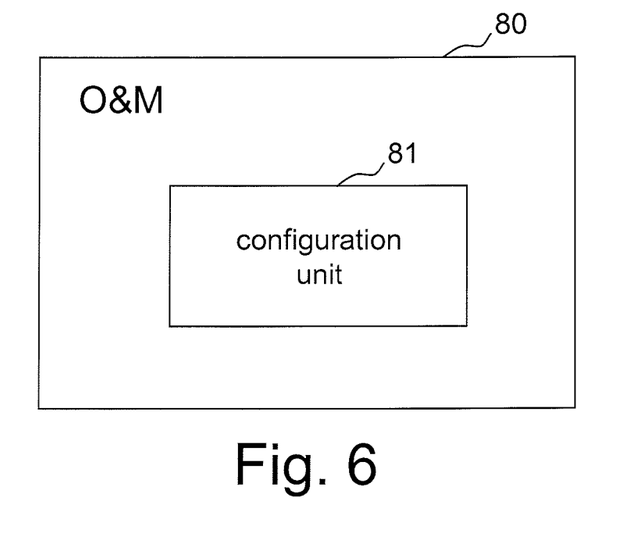
FIG. 6 is a schematic block diagram of an operation and maintenance node according to an embodiment of the present invention.

FIG. 6 illustrates an O&M node 80 according to an embodiment of the present invention and which is adapted as discussed above. The O&M node 80 includes a configuration unit 81 which is adapted to communicate with the home base station 1 to configure the home base station for local transportation. The configuration of the home base station 1 involves providing the home base station with configuration information regarding which destination addresses that are to be subject to local transportation, direct Internet transportation and/or core transportation.

If the home base station 1 uses the above mentioned feature of a configured local breakout address range (or address ranges) described above, including direct Internet transportation of Internet traffic (with only traffic to/from the 3GPP operator's IMS/service network transferred via the 3GPP core network 15), then the home base station 1 has the option to "inverse" the NAT behavior described above in the different embodiments. That is, the home base station 1 can interfere with the 3GPP IP address allocation mechanism by snooping the relevant messages and replacing the IP address allocated from the 3GPP core network 15 with a private address or an address from the address range of the broadband access network 14 (in the third embodiment), and then employ NAT functionality for the traffic transferred via the 3GPP core network 15 (i.e. the 3GPP IMS/service network traffic). For IMS/service network traffic the home base station 1 would translate between the replaced address allocated by the 3GPP core network 15 and the address actually allocated to the UE 2 and vice versa.

With this modification of the second embodiment the home base station 1 can forward local traffic (in the local CPE network 20) and Internet traffic (via the broadband access network 14) to and from the UE 2 without employing any NAT functionality, which is beneficial for some applications. The home base station 1 may also have to provide ALG functionality for the traffic transferred via the 3GPP core network 15. That would include ALG functionality for SIP (for IMS traffic) and possibly other application level protocols used for communication with services of the 3GPP service network.

In the above described second embodiment illustrated in FIG. 2, the home base station 1 is itself the router and NAT of the local CPE network 20 and can therefore allocate a private address to the UE 2 without any complications. In the above described third embodiment illustrated in FIG. 3, it is however more beneficial to give the UE 2 an address from the address range of the broadband access network 14, otherwise the home base station 1 would have to employ NAT functionality also for traffic transported by means of local transportation and direct Internet transportation, in addition to the traffic transported by means of core transportation. That is, the home base station 1 would have to employ NAT functionality for all traffic, which is clearly not beneficial. Therefore the home base station should have mechanisms in place allowing it to provide the UE 2 with an address from the broadband access network 14. The home base station 1 could do this by breaking out DHCP messages from the UE 2, so that the broadband access network 14 can allocate an IP address directly to the UE 2. To also acquire an address from the 3GPP core network 15, which is needed for 3GPP IMS/service network traffic, the home base station 1 would have to acquire an address from the 3GPP core network 15 on behalf of the UE 2 (i.e. it could act as a sort of "DHCP client proxy" on behalf of the UE 2 towards the 3GPP core network 15). As an alternative (e.g. if the UE 2 expects another address allocation mechanism than DHCP) the home base station 1 can acquire the IP address from the broadband access network 14 on behalf of the UE 2 (i.e. it could act as a sort of "DHCP client proxy" on behalf of the UE 2) and then replace the IP address conveyed from the 3GPP core network 15 with the address from the broadband access network 14 in the 3GPP address allocation signaling. These address allocation mechanisms could also be used to modify the first embodiment, although in that case the address replacing the address allocated from the 3GPP core network 15 would be a private address allocated by the CPE router 9.

The home base station 1 could also use the "DHCP client proxy" mechanism described above to acquire a dedicated IP address for the UE 2 (or separate dedicated address for each UE in case there are multiple UEs connected to the home base station 1). In the second embodiment the home base station 1 can itself assign a dedicated address to the UE 2 (or each connected UE). The dedicated UE address would however not be transferred to the UE 2, but kept in the home base station 1 to be used by the home base station's NAT functionality 17, 32. Giving the UE 2 (or each connected UE) a dedicated address is a conceivable additional embodiment for simplifying the home base station's NAT functionality 17, 32. Furthermore, the home base station 1 would still have a dedicated address of its own, which could be used, e.g., for management purposes (supposedly accessed locally by the UE owner).

As mentioned above, not only communication between a UE and nodes on the local CPE network 20 may benefit from breakout in the home base station. Also Internet access, i.e. traffic between a UE 2 and servers, hosts or other endpoints reached via the Internet 21 may benefit from bypassing the 3GPP core network 15. Benefits of this direct Internet transportation may be realized e.g. as lower overhead (because no IPsec tunnel is needed) and lower charges for the user. From the 3GPP operator's point of view a benefit is that the core network 15 is off-loaded which is particularly beneficial for the operator if flat rate (e.g. non-volume based) charges are used.

As described above, direct Internet transportation can be enabled by configuring address range(s) in the home base station 1 for which local transportation, direct Internet transportation and/or core transportation should be applied and/or should not be applied. As also described above, this configuration could be performed by the operator's O&M system. A possible alternative, or complement, is that the user can configure these address ranges in the home base station 1. It is however difficult for a user to know which address ranges are relevant to configure (for breakout or core transportation), so a simplified variant could be that the user can switch between breakout (for all traffic) and core transportation (for all traffic). With a good user interface for the home base station 1 the user could easily and quickly switch between breakout and core transportation, e.g. on a session by session basis.

Figure 4:
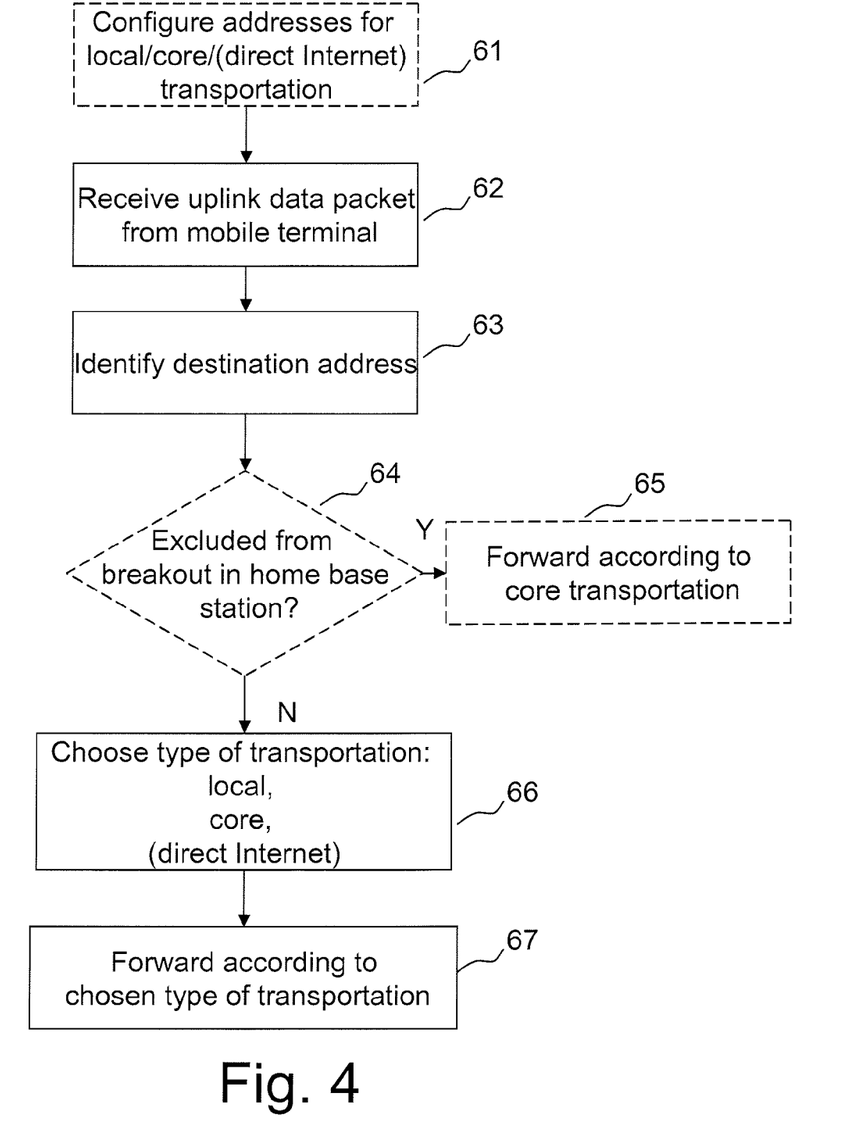
FIG. 4 is a flow diagram illustrating an embodiment of a method according to the present invention.

FIG. 4 is a flow diagram illustrating an embodiment according to the present invention of a method in a home base station for forwarding of data packets. The different steps of the method have been described above in connection with the different embodiments described above in connection with FIGS. 1-3 and 6, but FIG. 4 serves as a summary of those steps. In case the above mentioned feature where the home base station 1 is configured with address range(s) for which local, core and/or direct Internet transportation should be applied the method may start with such an optional step 61. In a step 62 an uplink data packet is received from the mobile terminal (UE) 62. The home base station snoops the uplink data packet, i.e. examines an address field, to identify the destination address of the packet in a step 63. Based on the identified destination address, the home base station will choose the type of transportation that should be applied to the received uplink data packet in a step 66. In a step 67, the uplink data packet is forwarded according to the chosen type of transportation. As mentioned above it may in some cases be of interest to exclude some traffic from breakout in the home base station 1, e.g. based on the fact that the bearer over which the traffic was received is not a best effort bearer or because the home base station has been configured to exclude some destination addresses from local breakout. If this is the case, then step 66 may be preceded by a step 64, in which the home base station checks if the uplink data packet should be excluded from breakout in the home base station. If this is the case the uplink data packet will be forwarded by means of core transportation in a step 65.

Figure 5:
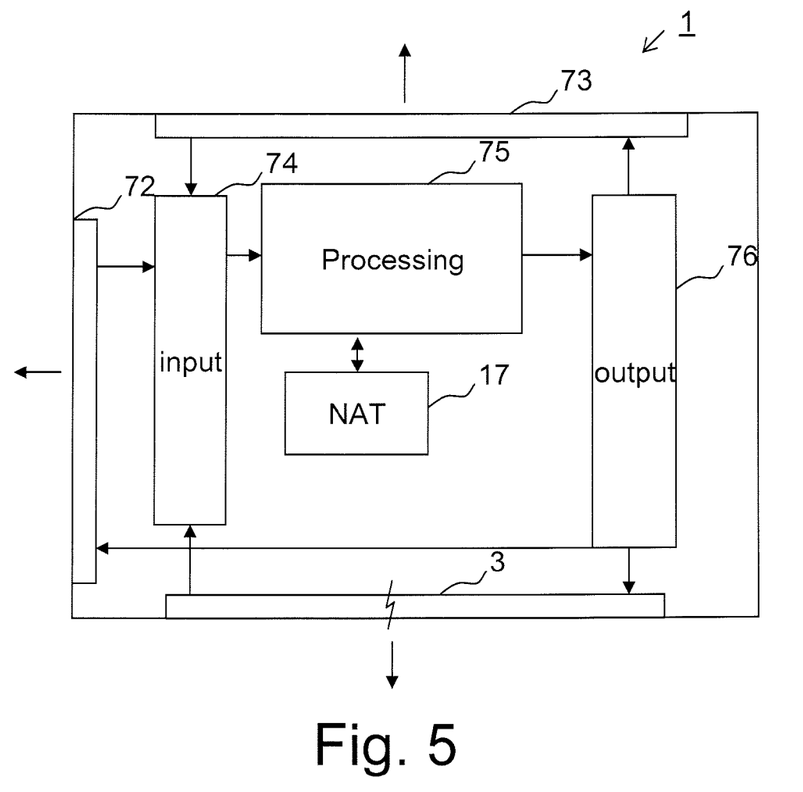
FIG. 5 is a schematic block diagram of a home base station according to an embodiment of the present invention.

FIG. 5 is a schematic block diagram that illustrates an embodiment of a home base station 1 according to an embodiment of the present invention. The home base station 1 comprises a radio interface 3 by means of which the home base station is able to communicate with one or several mobile terminals (UEs). The home base station also has interfaces 72 and 73 through which the home base station can connect to a number of local nodes and a core network of a mobile telecommunications system (e.g. the 3GPP core network 15) via an access network. The home base station further includes an input unit 74 and an output unit 76 adapted to respectively receive and forward data packets via the interfaces. A processing unit 75 of the home base station 1 is adapted to perform the above mentioned steps 63 and 66 (and possibly also optional step 64). FIG. 5 also illustrates that the home base station may include a NAT 17 as discussed. In addition, the home base station may include an ALG, although this is not illustrated in FIG. 5. The person skilled in the art will from the description herein understand how the different units of the home base station can be implemented using hardware, firmware and/or software.

In the drawings and specification, there have been disclosed typical preferred embodiments of the invention and, although specific terms are employed, they are used in a generic and descriptive sense only and not for purposes of limitation, the scope of the invention being set forth in the following claims.

Summary of Abbreviations Used Herein:
3G 3rd Generation
3GPP 3rd Generation Partnership Project
ADSL Asymmetric Digital Subscriber Line
ALG Application Level Gateway/Application Layer Gateway
ARP Address Resolution Protocol
BB Broadband
CPE Customer Premises Equipment
DNS Domain Name System
EPS Evolved Packet System
GGSN Gateway GPRS Support Node
Gi An interface between a GGSN in a 3G/UMTS core network and the operator's service network as well as external IP networks, such as the Internet.
GPRS General Packet Radio Service
HeNB Home eNode B
HN Home (e)Node B (i.e. either Home Node B or Home eNode B)
HNB Home Node B
IKEv2 Internet Key Exchange version 2
IMS IP Multimedia Subsystem
IP Internet Protocol
IPsec IP security (as defined in RFC 4301)
IPv4 Internet Protocol version 4
IPv6 Internet Protocol version 6
L2 Layer 2
LAN Local Area Network
LTE Long Term Evolution
MAC Media Access Control
MGW Media Gateway
MME Mobility Management Entity
MSC Mobile Switching Center
NAS Non-Access Stratum
NAT Network Address Translation/Translator
O&M Operation and Maintenance
PDCP Packet Data Convergence Protocol
PDN Packet Data Network
QoS Quality of Service
RFC Request For Comments
RLC Radio Link Control
RNC Radio Network Controller
SAE System Architecture Evolution
SGi An interface between a PDN Gateway in an EPS core network and the operator's service network as well as external IP networks, such as the Internet.
SGSN Serving GPRS Support Node
S-GW Serving Gateway
SIP Session Initiation Protocol
SLP Service Location Protocol
SSDP Simple Service Discovery Protocol
TS Technical Specification
UE User Equipment
UMTS Universal Mobile Telecommunications System
UPnP Universal Plug and Play
URL Uniform Resource Locator
WLAN Wireless Local Area Network
xDSL X Digital Subscriber Line (referring to the DSL family of technologies where "X" stands for any of the letters that can be placed before "DSL", e.g. A or V)

The invention claimed is:

1. A method in a home base station for forwarding of data packets, wherein said home base station has a connection to at least one mobile terminal over a radio interface, a connection to a number of local nodes of a local network, and a connection to a core network of a mobile telecommunications system via an access network, said method comprising:
    receiving a number of uplink data packets from the mobile terminal over a number of bearers;
    for each of the uplink data packets, examining an address field of the uplink data packet received from the mobile terminal to identify a destination address associated with the uplink data packet;
    for each of the uplink data packets, choosing if the packet is to be subject to local transportation and/or core transportation based on the identified destination address, wherein local transportation comprises forwarding the uplink data packet to a local node over the local network without passing the core network, and core transportation comprises forwarding the uplink data packet to the core network; and
    for each of the uplink data packets, forwarding the uplink data packet in accordance with the chosen type of transportation,
    wherein choosing comprises choosing local transportation for a first uplink data packet of the number of uplink data packets responsive to a first destination address of the first uplink data packet, and choosing core transportation for a second uplink data packet of the number of uplink data packets responsive to a second destination address of the second uplink data packet, and wherein forwarding the uplink data packet comprises forwarding the first uplink data packet to the local node via a Local Area Network (LAN) router of the local network responsive to choosing local transportation, and forwarding the second uplink data packet to the core network responsive to choosing core transportation.

2. The method according to claim 1, wherein the home base station is a 3G Home Node B or an EPS/LTE Home eNode B of a home Local Area Network (LAN), the core network is a 3GPP core network, the connection to the core network is a secure tunnel and wherein examining the address field of the uplink data packet comprises using the 3G Home Node B or the EPS/LTE Home eNode B of the home LAN to snoop the destination address in an IP header of the uplink data packet.

3. The method according to claim 1, wherein the uplink data packet is chosen for local transportation if the destination address is identified as a multicast address, a broadcast address or a unicast address belonging to a predetermined address range of local addresses.

4. The method according to claim 1, wherein the uplink data packet is chosen for both local transportation and core transportation if the destination address is identified as a multicast address or a broadcast address.

5. The method according to claim 1, further comprising:
checking if the uplink data packet is excluded from local transportation, wherein the uplink data packet is excluded from local transportation if the bearer over which the uplink data packet was received from the mobile terminal is not a best effort bearer or if the destination address belongs to a predetermined address range of addresses excluded from local transportation; and
forwarding the uplink data packet by means of core transportation if the uplink data packet is excluded from local transportation.

6. The method according to claim 1, further comprising:
configuring the home base station for local transportation, wherein configuring includes communicating with an operation and maintenance system to receive configuration information regarding destination addresses that are to be subject to local transportation and/or destination addresses that are to be subject to core transportation.

7. The method according to claim 1, wherein choosing further includes choosing if the uplink data packet is to be subject to direct Internet transportation based on the identified destination address, wherein direct Internet transportation comprises forwarding the uplink data packet to the Internet via the access network without passing the core network.

8. The method according to claim 7, further comprising:
configuring the home base station for direct Internet transportation, wherein said configuring includes communicating with an operation and maintenance system to receive configuration information regarding destination addresses that are to be subject to local transportation and/or destination addresses that are not to be subject to direct Internet transportation.

9. The method according to claim 1, wherein the access network allocates one or several public IP addresses to the number of local nodes and wherein the home base station is connected to the access network and to the number of local nodes via a Layer 2 switch.

10. The method according to claim 9, wherein the method further comprises:
classifying an address as a local address, which classifying includes identifying a source address of a data packet destined to the mobile terminal which is received in the home base station from one of said number of local nodes, and classifying the identified source address as a local address, wherein the uplink data packet is chosen for local transportation if the destination address is identified as a previously classified local address.

11. The method according to claim 1, wherein the access network allocates a single public IP address to each subscriber of the access network and wherein the home base station is connected to the access network and to the number of local nodes via a router with a network address translator.

12. The method according to claim 9, wherein the uplink data packet is chosen for local transportation if the destination address is identified as belonging to an address range indicated by a network mask and an address allocated to the home base station.

13. The method according to claim 11, wherein the uplink data packet is chosen for local transportation if the destination address is identified as belonging to a private range.

14. The method according to claim 1, wherein the access network allocates a single public IP address to each subscriber of the access network and wherein the home base station includes an integrated router with a network address translator, and allocates IP addresses to the number of local nodes from a private range.

15. The method according to claim 14, wherein the uplink data packet is chosen for local transportation if the destination address is identified as an address in the private range that the home base station has allocated to a local node.

16. The method according to claim 10, further comprising:
performing network address translation including
replacing a source address of the uplink data packet with an address of the home base station, and creating a network address translation state in the home base station if the uplink data packet is chosen for local transportation, and
replacing a destination address of a downlink data packet with an address of the mobile terminal using the network address translation state if the downlink data packet is destined for the mobile terminal and is received over the connection to the local network.

17. The method according to claim 1, further comprising:
acquiring a dedicated IP address for the mobile terminal and storing the dedicated IP address in the home base station for use in forwarding data packets to and from the mobile terminal.

18. The method according to claim 1, wherein the connection to the local network and the connection to the core network comprise at least one Ethernet/WLAN connection.

19. A home base station for forwarding of data packets, wherein said home base station comprises:
a radio interface adapted to connect to at least one mobile terminal;
an interface adapted to connect to a local network comprising a number of local nodes of a local network;
an interface adapted to connect to a core network of a mobile telecommunications system via an access network;
an input unit adapted to receive a number of uplink data packets from the mobile terminal over a number of bearers;
a processing unit adapted to examine an address field of an uplink data packet among the number of uplink data packets received from the mobile terminal to identify a destination address associated with the uplink data packet, and adapted to choose if the packet is to be subject to local transportation and/or core transportation based on the identified destination address, wherein local transportation comprises forwarding the uplink data packet to a local node over the local network without passing the core network, and core transportation comprises forwarding the uplink data packet to the core network; and an output unit adapted to forward the uplink data packet in accordance with the type of transportation chosen by the processing unit, wherein the processing unit is adapted to choose local transportation for a first uplink data packet of the number of uplink data packets responsive to a first destination address of the first uplink data packet, and to choose core transportation for a second uplink data packet of the number of uplink data packets responsive to a second destination address of the second uplink data packet, and wherein the output unit is adapted to forward the first uplink data packet to the local node via a Local Area Network (LAN) router of the local network responsive to choosing local transportation, and to forward the second uplink data packet to the core network responsive to choosing core transportation.

20. The home base station according to claim 19, wherein the home base station is a 3G Home Node B or an EPS/LTE Home eNode B of a home Local Area Network (LAN), the core network is a 3GPP core network, the home base station is adapted to connect to the core network by means of a secure tunnel and the processing unit of the home base station of the home LAN is adapted to examine the address field of the uplink data packet by snooping the destination address in an IP header of the uplink data packet.

21. The home base station according to claim 19, wherein the processing unit is adapted to choose the uplink data packet for local transportation if the destination address is identified as a multicast address, a broadcast address or a unicast address belonging to a predetermined address range of local addresses.

22. The home base station according to claim 19, wherein the processing unit is adapted to choose the uplink data packet for both local transportation and core transportation if the destination address is identified as a multicast address or a broadcast address.

23. The home base station according to claim 19, wherein the processing unit is further adapted to check if the uplink data packet is excluded from local transportation, wherein the uplink data packet is excluded from local transportation if the bearer over which the uplink data packet was received from the mobile terminal is not a best effort bearer or if the destination address belongs to a predetermined address range of addresses excluded from local transportation; and wherein the output unit is adapted to forwarding the uplink data packet by means of core transportation if the uplink data packet is excluded from local transportation.

24. The home base station according to claim 19, wherein the home base station is adapted to be configured for local transportation by an operation and maintenance system, wherein the configuration includes storing configuration information regarding destination addresses that are to be subject to local transportation and/or destination addresses that are to be subject to core transportation.

25. The home base station according to claim 19, wherein the processing unit is further adapted to choose if the packet is to be subject to direct Internet transportation based on the identified destination address, wherein direct Internet transportation comprises forwarding the uplink data packet to the Internet via the access network without passing the core network.

26. The home base, station according to claim 25, wherein the home base station is adapted to be configured for direct Internet transportation by an operation and maintenance system, wherein the configuration includes storing configuration information regarding destination addresses that are to be subject to direct Internet transportation and/or destination addresses that are not to be subject to direct Internet transportation.

27. The home base station according to claim 19, wherein the home base station is adapted to connect to the access network and to the number of local nodes via a Layer 2 switch.

28. The home base station according to claim 27, wherein the processing unit is further adapted to classify an address as a local address, which classification includes identifying a source address of a data packet destined to the mobile terminal which is received in the home base station from one of said number of local nodes, and classifying the identified source address as a local address, and adapted to choose the uplink data packet for local transportation if the destination address is identified as a previously classified local address.

29. The home base station according to claim 19, wherein the home base station is adapted to connect to the access network and to the number of local nodes via a router with a network address translator.

30. The home base station according to claim 27, wherein the processing unit is adapted to choose the uplink data packet for local transportation if the destination address is identified as belonging to an address range indicated by a network mask and an address allocated to the home base station.

31. The home base station according to claim 29, wherein the processing unit is adapted to choose the uplink data packet for local transportation if the destination address is identified as belonging to a private range.

32. The home base station according to claim 19, wherein the home base station includes an integrated router with a network address translator, and is adapted to allocate IP addresses to the number of local nodes from a private range.

33. The home base station according to claim 32, wherein the processing unit is adapted to choose the uplink data packet for local transportation if the destination address is identified as an address in the private range that the home base station has allocated to a local node.

34. The home base station according to claim 28, wherein the home base station further comprises:

a network address translator adapted to replace a source address of the uplink data packet with an address of the home base station and create a network address translation state in the home base station if the uplink data packet is chosen for local transportation, and adapted to replace a destination address of a downlink data packet with an address of the mobile terminal using the network address translation state if the downlink data packet is destined for the mobile terminal and is received over a connection to the local network.

35. The home base station according to claim 19, wherein the processing unit is adapted to acquire a dedicated IP address for the mobile terminal and store the dedicated IP address in the home base station for use in forwarding data packets to and from the mobile terminal.

36. The home base station according to claim 19, wherein the home base station is adapted to connect to the local network and to the core network respectively via at least one Ethernet/WLAN connection.

37. An operation and maintenance node for use in an operation and maintenance system of a telecommunications system, the node comprising:
- a configuration unit which is adapted to communicate with a home base station to configure the home base station for local transportation and/or direct Internet transportation,
- wherein configuration of the home base station involves providing the home base station with configuration information regarding which destination addresses are to be subject to local transportation, direct Internet transportation and/or core transportation,
- wherein local transportation comprises forwarding a first uplink data packet, received in the home base station from a mobile terminal over a radio interface, to a local node via a Local Area Network (LAN) router of a local network without passing a core network of a mobile telecommunications system, responsive to a first destination address of the first uplink data packet,
- wherein direct Internet transportation comprises forwarding a second uplink data packet, received in the home base station from the mobile terminal over the radio interface, to the Internet via an access network without passing the core network of the mobile telecommunications system, responsive to a second destination address of the second uplink data packet, and
- wherein core transportation comprises forwarding a third uplink data packet, received in the home base station from the mobile terminal over the radio interface, to the core network of the mobile telecommunications system, responsive to a third destination address of the third uplink data packet.

38. A method in an operation and maintenance node of an operation and maintenance system of a telecommunications system, the method comprising:
- configuring a home base station for local transportation and/or direct Internet transportation, which configuring includes communicating with the home base station to provide the home base station with configuration information regarding which destination addresses are to be subject to local transportation, direct Internet transportation and/or core transportation,
- wherein local transportation comprises forwarding a first uplink data packet, received in the home base station from a mobile terminal over a radio interface, to a local node via a Local Area Network (LAN) router of a local network without passing a core network of a mobile telecommunications system, responsive to a first destination address of the first uplink data packet,
- wherein direct Internet transportation comprises forwarding a second uplink data packet, received in the home base station from the mobile terminal over the radio interface, to the Internet via an access network without passing the core network of the mobile telecommunications system, responsive to a second destination address of the second uplink data packet, and
- wherein core transportation comprises forwarding a third uplink data packet, received in the home base station from the mobile terminal over the radio interface, to the core network of the mobile telecommunications system, responsive to a third destination address of the third uplink data packet.

* * * * *

UNITED STATES PATENT AND TRADEMARK OFFICE
CERTIFICATE OF CORRECTION

PATENT NO.       : 8,705,553 B2                                    Page 1 of 1
APPLICATION NO.  : 13/121793
DATED            : April 22, 2014
INVENTOR(S)      : Rune It is certified that error appears in the above-identified patent and that said Letters Patent is hereby corrected as shown below:

On the Title Page, Item (51), under "Int. Cl.", in Column 1, Line 3, insert -- H04L 12/5692 --.

On the Title Page, Item (57), under "ABSTRACT", in Column 2, Line 11, delete "terminal (1)" and insert -- terminal (2) --, therefor.

In the Claims

In Column 20, Line 4, in Claim 26, delete "base," and insert -- base --, therefor.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,705,553 B2
APPLICATION NO. : 13/121793
DATED : April 22, 2014
INVENTOR(S) : Rune It is certified that error appears in the above-identified patent and that said Letters Patent is hereby corrected as shown below:

On the title page, Item (73), under "Assignee", in Column 1, Line 1, delete "Telefonaktiebolaget LM Ericsson," and insert -- Telefonaktiebolaget L M Ericsson (publ), --, therefor.

Signed and Sealed this
Twenty-first Day of October, 2014

Michelle K. Lee
*Deputy Director of the United States Patent and Trademark Office*